United States Patent
Berardi

[15] 3,651,942
[45] Mar. 28, 1972

[54] REACTOR FILTER ASSEMBLY

[72] Inventor: Martin J. Berardi, 149 N.E. 98th Street, Miami Shores, Fla. 33315

[22] Filed: June 22, 1970

[21] Appl. No.: 47,961

[52] U.S. Cl. ........................... 210/140, 210/203, 210/258, 210/284
[51] Int. Cl. ........................... B01d 29/38, B01d 29/08
[58] Field of Search .................. 210/284, 279, 199, 140, 258, 210/201, 203

[56] References Cited

UNITED STATES PATENTS

| | | | |
|---|---|---|---|
| 409,611 | 8/1889 | Murphy | 210/284 |
| 3,442,387 | 5/1969 | Berardi | 210/279 X |
| 2,204,703 | 6/1940 | Sanders | 210/199 X |

Primary Examiner—Frank A. Spear, Jr.
Attorney—Jessup & Beecher

[57] ABSTRACT

A reactor filter assembly is provided for purifying water, or other liquids, in an effluent stream, and which is designed, for example, to have a multistate construction. A four-stage system will be described. The influent to the system is first treated with conditioning chemicals and aerated for oxidation and for the removal of undesired gases. The conditioned liquid is then upflowed to a velocity suspended flocculation bed into a first solid retention stage, and the operation may be repeated in a second similar stage. A further stage is then provided for final polishing of the filtered water. Backwash and sludge drainage is provided in the system, and may be automatically controlled so that the entire assembly may be unattended.

9 Claims, 4 Drawing Figures

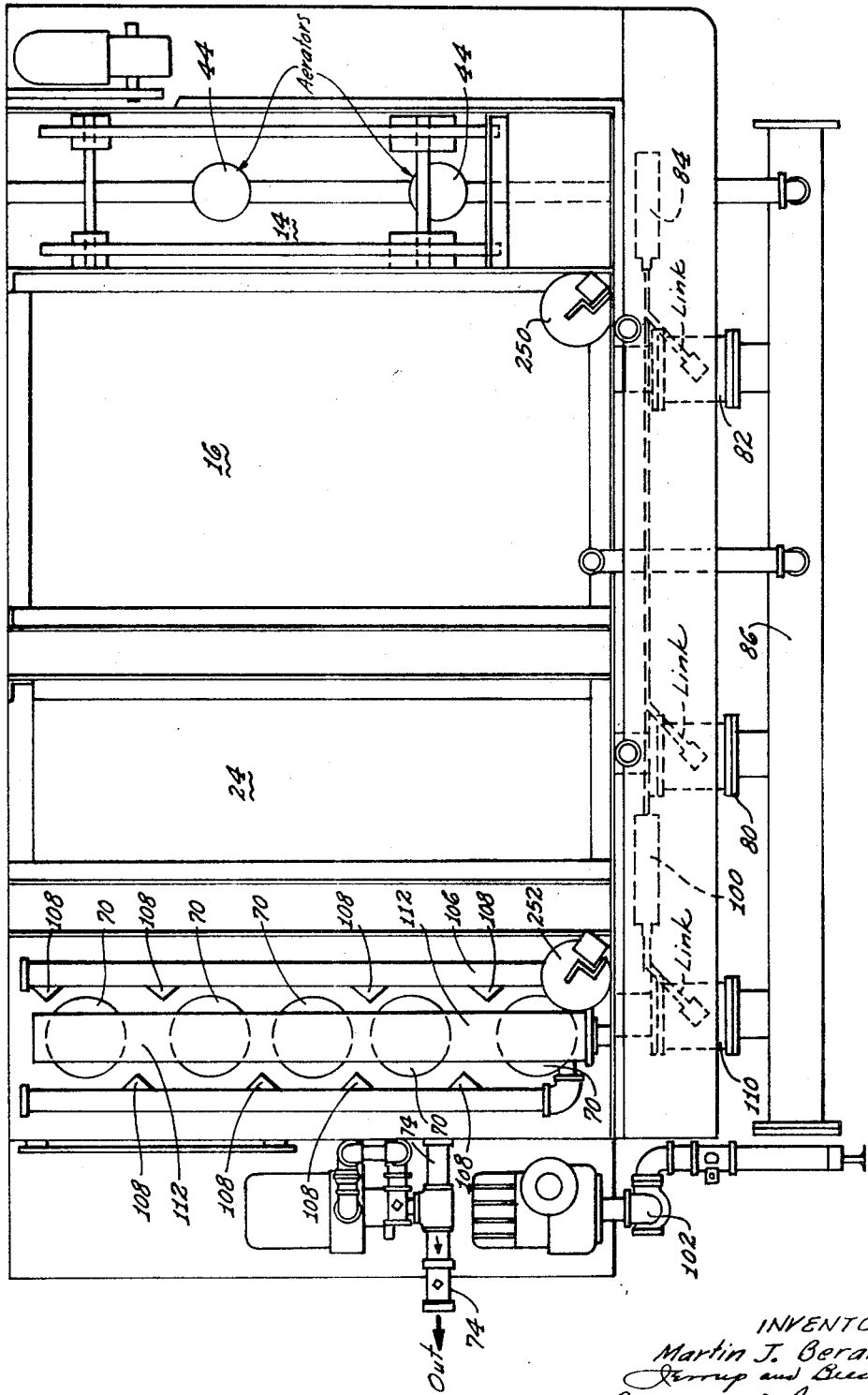

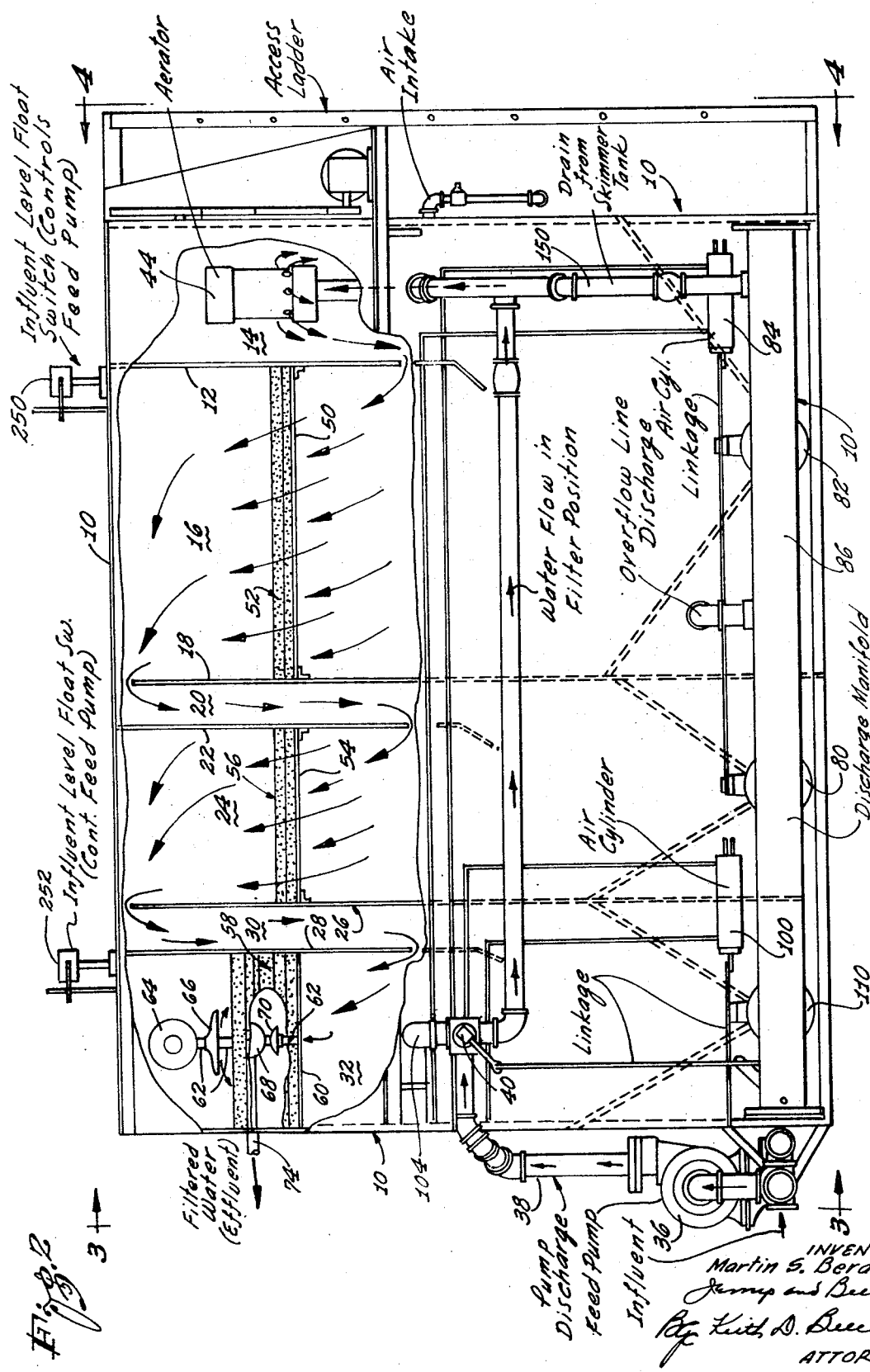

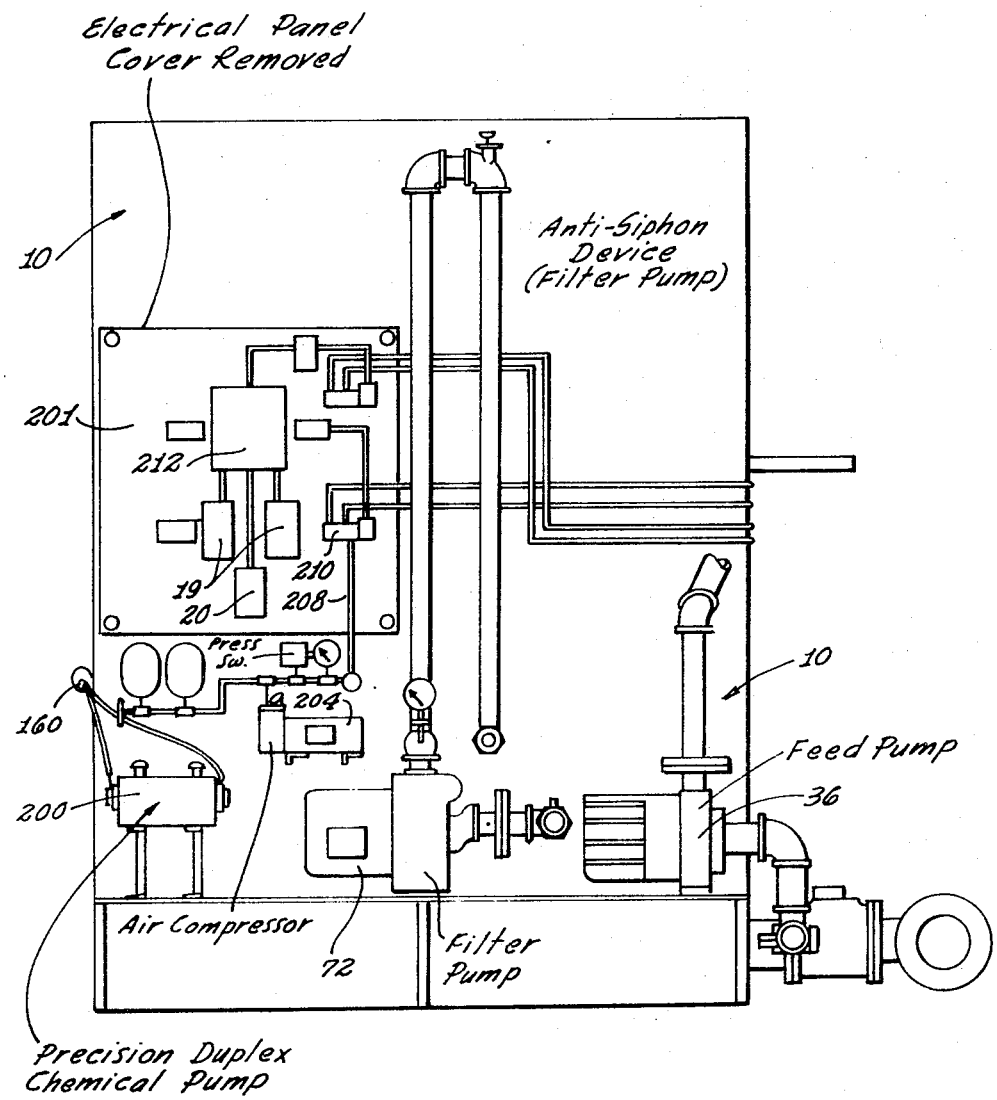

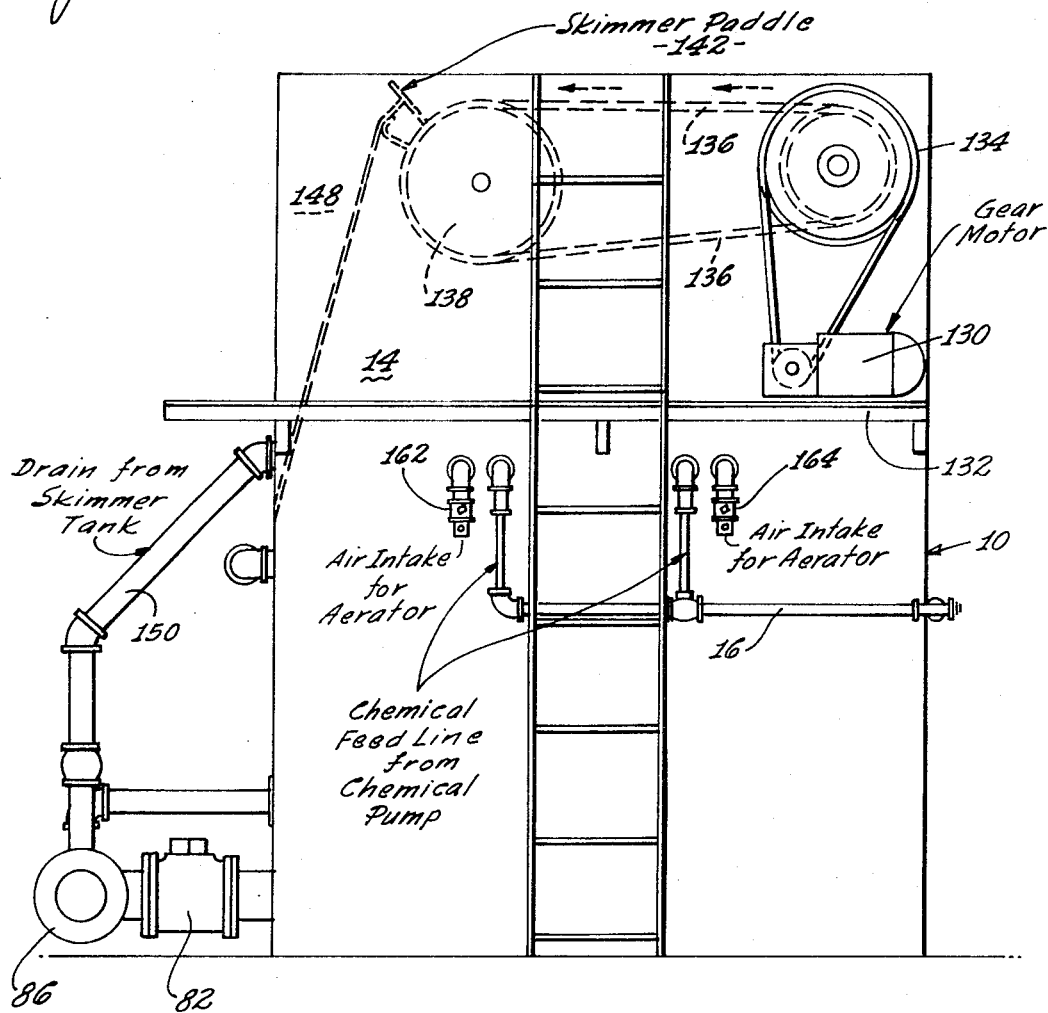

REACTOR FILTER ASSEMBLY

BACKGROUND OF THE INVENTION

The quality of the effluents from secondary waste treatment plants are in many cases no longer acceptable by Regulatory Pollution Standard Boards, and these effluents must be upgraded to meet present requirements. Biochemical Oxygen Demand (BOD), while still the main criterion of stream pollution, is not the only index. Suspended solids, nutrients and industrial contaminants all contribute to overall stream pollution.

The reaction filter assembly of the present invention is a versatile liquid-solid separation system which finds particular utility in the treatment of secondary waste treatment plant effluents, and for removing the aforesaid contaminants which appear therein, and which usually pollute the stream beyond present-day requirements.

The reactor filter assembly of the invention is advantageous in that it has an uncomplicated flow pattern, so that it is easy and simple to control insofar as its main functions are concerned. The reactor filter assembly of the invention also has the feature in that it may be constructed to exhibit ample sludge storage capabilities. Moreover, rapid preconditioning and efficient pre-separation of the liquid being processed by the equipment permit heavy shock loadings of suspended solids in the equipment without materially affecting the quality of its effluent.

The assembly of the invention also has a feature in that it may be constructed to occupy a minimum of space due to its high rate of solid pre-separation followed by fast effective filtration. In brief, the apparatus to be described is compact in size, rugged in construction, efficient and simple in operation, and economical in its overall concept.

The reactor filter assembly of the invention has wide utility in the water purification and waste water treatment field, and specifically where BOD and suspended solids must be removed from a secondary effluent; where phosphate must be removed, for example, from an effluent stream; or, for example, where iron, manganese, dissolved gases and turbidity must be removed from water.

BRIEF DESCRIPTION OF THE DRAWINGS

FIG. 1 is a front plan view of a reactor filter assembly constructed to incorporate the concepts of the present invention;

FIG. 2 is a side elevation of the assembly of FIG. 1;

FIG. 3 is an end view taken along the line 3—3 of FIG. 1; and

FIG. 4 is an end view taken along the line 4—4 of FIG. 1.

DETAILED DESCRIPTION OF THE ILLUSTRATED EMBODIMENT

The reactor filter assembly of the present invention, in the embodiment illustrated, for example, in FIGS. 1–4 includes a housing 10, which in the illustrated embodiment is in the form of a rectangular tank having inner partitions defining a plurality of separate compartments. For example, the tank has a first partition 12 which separates an aerator and chemical mixing compartment 14 from a first precipitation compartment 16. A further partition 18 defines a duct 20 with a partition 22. The duct 20 has an opening in the partition 18 which communicates with the upper end of the compartment 16, and it has a further opening in the partition 22 which communicates with the lower end of a further precipitation compartment 24. A partition 26 and a further partition 28 define another duct 30, the duct 30 having an opening through the partition 26 into the upper end of the compartment 24, and an opening through the partition 28 into the lower end of a further compartment 32. The compartment 32 may contain filter apparatus similar to the apparatus described, for example, in U.S. Pat. No. 3,459,305 which issued Aug. 5, 1969 in the name of the present inventor.

A feed pump 36 is mounted on the left-hand end of the tank 10 in FIG. 2, for example, and the feed pump draws the influent to the reactor filter assembly from any appropriate source whose effluent is to be upgraded. The pump 36 pumps the liquid through a line 38 and through a valve 40 to a further line 42 during normal operation of the system. The line 42 extends into the compartment 14 and is coupled to a pair of aerators and chemical mixer units 44. The units 44 may be similar in their construction and function to the aerator apparatus described, for example, in U.S. Pat. No. 3,442,387 which issued May 6, 1969 in the name of the present inventor. The function of the aerator units 44 is to mix chemicals into the influent liquid in order to obtain precipitation and coagulation of the suspended solids, BOD and nutrients.

The treated liquid from the compartment 14 passes under the partition 12 to the lower end of the precipitation compartment 16 and is forced up through a perforated baffle member 50 which is mounted in the compartment 16 and which extends across the compartment. The baffle member 50 may, for example, be a perforated metallic member formed with a "-Dutch Weave." The liquid forced into the lower end of the compartment 16 passes upwardly through the baffle member 50, and is strained through the baffle member. The floculations in the liquid tend to congregate on the lower side of the baffle member 50, and assist in the straining action, so that sludge-like solids are caused to congregate in the lower part of the compartment 16. An appropriate filter bed is supported on the baffle member 50 to serve as a retention means for the floculations and solids. Therefore, the screen baffle 50 and the filter bed 52 supported on the baffle prevent the floculations and solids from rising in the compartment 16. The filter bed may be composed, for example, of 3/16 (No. 10) gravel, and it may be of the order of 4 inches deep.

As the influent liquid travels upwardly in the compartment 16, it spills into the duct 20 from the top of the compartment, and it is carried by the duct down to the lower end of the compartment 24, where the process is repeated. The compartment 24, like the compartment 16, has a porous baffle 54 extending across it which may be similar in its construction to the porous baffle 50. A filter bed 56 is supported on the porous baffle 54. This latter filter bed may, for example, be composed of somewhat finer filter material than the previous bed. For example, it may include 2 inches of 3/16 (No. 10) gravel, and 2 inches of 6 × 20 mm sand.

The influent liquid passing upwardly in the compartment 24 flows into the duct 30, and it is carried by the duct down to the lower end of the compartment 32 for final filtration and polishing. As a result of the action within the compartment 16 and 24, at least 90 percent of the solids are normally removed from the influent liquid, and these solids congregate at the bottoms of the compartment 16 and 24, for subsequent de-sludging, as will be described. As mentioned above, the filter compartment 32 may be similar in its structure and operation to the filter apparatus described in the aforesaid U.S. Pat. No. 3,459,305.

As described in the said U.S. Pat. No. 3,459,305, an appropriate filter bed 58 is supported on an impervious baffle 60. The filter bed 58 may, for example, be composed of 8 inches of 3/16 (No. 10) gravel, 5 inches of 6 × 20 mm sand, and 23 inches of 0.4–0.5 mm sand. The liquid passing into the lower end of the compartment 32 is carried through a central conduit 62 up to a manifold 64 at the upper end of the filter compartment, and the liquid is sprayed from nozzles 66 associated with the manifold 64 and passes downwardly through the filter bed 58. The influent liquid at the bottom of the filter bed is drawn into a manifold 68 through nozzles 70 by means of a discharge pump 72 (FIG. 1), and it is drawn through a discharge line 74 from the manifold by the pump to be subsequently discharged as indicated in FIG. 1.

For de-sludging the compartments 16 and 24, a troughlike member (not shown) extends across the bottom of each compartment. The bottom of each compartment has a V-shaped configuration, as shown in FIG. 2, so that all the sludge is directed toward the troughlike member. The troughlike member of each compartment is coupled to respective valves 80 and 82 (FIG. 1), and these valves may be operated together by an hydraulic air cylinder 84 and appropriate linkage 86. When the hydraulic cylinder is operated, the valves 80 and 82 are opened, so that the liquid within the compartments 16 and 24 is forced by gravity down and out through the valve, and through a manifold 86 to which the valves are coupled into an appropriate discharge line. During the latter de-sludging operation, the pumps 36 and 72 should be stopped.

The filter compartment 32 may be back-washed by operating the valve 40. The valve 40 may be actuated, for example, by an hydraulic air cylinder 100 which is linked to the valve. The air cylinder 100 is also linked to a further valve 102, so that the pump 36 is coupled to a fresh back-water source, rather than to the effluent stream, during the backwash operation. When the valve 40 is so actuated, the pump 36 causes the backwash water to be forced into the lower end of the compartment 30 through an inlet pipe 104. The backwash water is carried up a conduit (not shown) to a manifold 106 (FIG. 1) which is positioned on the baffle 60 within the filter bed 58.

As best shown in FIG. 1, for example, the manifold 106 has a U-shaped configuration, and it is equipped with a series of nozzles 108 through which the backwash water is ejected, and caused to rise up through the filter bed to be received by the nozzles 66 and manifold 64 and subsequently discharged through a valve 110 which also is operated by the air cylinder 100 so that the backwash products pass into the manifold 86 for subsequent discharge. The aforesaid discharge nozzles 70 are mounted on a manifold 112 which is coupled to the aforesaid discharge line 74. As shown, the nozzles 70 and manifold 112 lie at the bottom of the filter bed 58 in the filter compartment between the U-shaped backwash manifold 106.

As shown in FIGS. 1, 2 and 4, for example, a skimmer system may be provided within the compartment 14, the skimmer being driven by an electric gear member 130 mounted on a bracket 132 at one end of the tank 10. The motor 130 is coupled by a belt drive to a drive pulley 134 which, in turn, drives a chain 136 which is wrapped around an idler pulley 138. As the chain 136 is driven, one or more skimmer paddles 142 are caused to skim the surface of the liquid within the compartment 14, and cause the skimmed constituents and liquids passed into a separate compartment 148 to be drained through a drain line 150 into the manifold 86 for discharge into the discharge line.

As also shown in FIG. 4, for example, chemicals to the two aerated units 44 are fed through a line 160, whereas air intakes for the aerators are provided by respective air intake lines 162 and 164. A chemical pump 200 at the other end of the tank 10 (FIG. 3) pumps properly proportioned chemicals to the aerator units through the line 160.

The electrical control panel 201 is mounted on the end of the tank shown in FIG. 3. An air compressor 204 is provided, together with appropriate air tanks 206, and the system provides compressed air in a line 208 which is controlled by a solenoid valve 210 to supply the required compressed air to the air cylinders 84 and 100 for automatic control of the sludging backwashing operations at times determined by an appropriate timer circuit contained, for example, within a switch box 212. Other electrical controls are also provided, but need not be described in detail herein. The purpose of the electrical controls are to provide automatic operation of the apparatus, and also to provide automatically for the aforesaid periodic de-sludging and backwash operations.

An influent level flow switch 250 (FIG. 2) serves to control the feed pump 36 to cut off the feed pump whenever the level of liquid in the compartment 16 rises above a predetermined level. A second level flow switch 252 controls the discharge pump 72 so as to cut off that pump whenever the liquid level in the filter compartment 32 drops below a predetermined level. The control is such that whenever the levels are restored, the pumps are automatically re-energized.

The invention provides, therefore, a simple and straightforward system which operates efficiently to remove solids and other constituents from an effluent stream, and which also serves to provide a final polish filtering action, if required.

It will also be appreciated that while a particular embodiment of the invention has been shown and described, modifications may be made, and the following claims are intended to cover all modifications as fall within the spirit and scope of the invention.

What is claimed is:

1. A reactor filter assembly for removing pollutants from a liquid effluent stream, comprising: housing means defining a plurality of separate compartments including a first compartment and a second compartment adjacent to one another; a porous screen baffle member extending across said first compartment; said housing means further defining a preconditioning compartment adjacent said first compartment, chemical mixing and aerating means mounted in said preconditioning compartment, and said preconditioning compartment having an outlet at the lower end thereof for introducing the liquid therefrom into the lower end of said first compartment; means including a feed pump for introducing the liquid from the aforesaid stream into said preconditioning compartment; said preconditioning compartment introducing the liquid therefrom into said first compartment at the lower end thereof and forcing said liquid upwardly in said first compartment through said baffle member to be discharged at the upper end thereof; duct means for feeding the liquid discharged from the upper end of said first compartment into the lower end of said second compartment to be forced up through said second compartment.

2. The reactor filter assembly defined in claim 1, in which said baffle supports a bed of gravel-like material to inhibit the passage of solids and fluculents from passing through the aforesaid compartment.

3. The reactor filter assembly defined in claim 1, and which includes outlet means at the bottom of said first and second compartments, and valve means in said outlet means to permit gravity flow desludging of said first and second compartments when said valve means are open.

4. The reactor filter assembly defined in claim 3, and which includes electrically activated automatic control means coupled to said valve means for opening said valve means after predetermined operating intervals, and for thereafter closing said valve means after a predetermined desludging interval.

5. The reactor assembly defined in claim 1, and which includes skimming means mounted in said preconditioning compartment for removing floating material from the liquid therein.

6. The reactor filter assembly defined in claim 1, and which includes, an impervious baffle member extending across said second compartment, a filter bed supported on said impervious baffle member, conduit means extending through said impervious baffle member and through said filter bed to feed the liquid introduced into the lower end of said second compartment up to the upper end of said second compartment to flow down through said filter bed; and discharge means for the liquid positioned at the bottom of said filter bed.

7. The reactor filter assembly defined in claim 6, and which includes backwash means in said second compartment for directing backwash water up through said filter bed.

8. The reactor filter assembly defined in claim 7, and which includes automatic control means for actuating said backwash means after predetermined operating intervals.

9. The reactor filter assembly defined in claim 6, and which includes a discharge pump coupled to said discharge means for drawing the liquid through said discharge means.

* * * * *